United States Patent
Tsuda et al.

(10) Patent No.: US 6,361,865 B1
(45) Date of Patent: Mar. 26, 2002

(54) METHOD FOR SURFACE-COATING SYNTHETIC RESINS

(75) Inventors: Nobuhiko Tsuda; Ryuji Iwakiri; Masaru Nagato; Katsuhiko Imoto, all of Settsu (JP)

(73) Assignee: Daikin Industries, Ltd., Osaka (JP)

( * ) Notice: Subject to any disclaimer, the term of this patent is extended or adjusted under 35 U.S.C. 154(b) by 0 days.

(21) Appl. No.: 09/423,046

(22) PCT Filed: Apr. 23, 1998

(86) PCT No.: PCT/JP98/01893

§ 371 Date: Mar. 9, 2000

§ 102(e) Date: Mar. 9, 2000

(87) PCT Pub. No.: WO98/48949

PCT Pub. Date: Nov. 5, 1998

(30) Foreign Application Priority Data

Apr. 30, 1997 (JP) ................................. 9-113036

(51) Int. Cl.7 ................................................ B32B 27/36
(52) U.S. Cl. ........................................................ 428/412
(58) Field of Search ........................................ 428/412

(56) References Cited

U.S. PATENT DOCUMENTS 5,275,886 A    1/1994   Chu et al.

FOREIGN PATENT DOCUMENTS

| EP | 0 748 826 | 12/1996 | |
| EP | 0 750 014 | 12/1996 | |
| JP | 2-132101 | 5/1990 | C08F/2/22 |
| JP | 2-228377 | 9/1990 | C09D/5/44 |
| JP | 2-233748 | 9/1990 | C08L/27/12 |
| JP | 2-308843 | 12/1990 | C08L/27/12 |
| JP | 7-150099 | 6/1995 | C09D/127/12 |
| JP | 7-238253 | 9/1995 | C09D/151/06 |
| JP | 9-157314 | 6/1997 | C08F/2/44 |
| JP | 9-165490 | 6/1997 | C08L/51/06 |

OTHER PUBLICATIONS

Supplementary European Search Report for EP 98917667 dated Sep. 26, 2000.

International Preliminary Examination Report for PCT/JP98/01893 datd Jul. 21, 1999.

International Search Report for PCT/JP98/01893 dated Aug. 4, 1998.

*Primary Examiner*—Terressa M. Boykin
(74) *Attorney, Agent, or Firm*—Sughrue Mion, PLLC

(57) ABSTRACT

A surface protective coating layer being excellent in weather resistance and chemical resistance is formed on a synthetic resin substrate. An aqueous dispersion of fluorine-containing resin is applied to the synthetic resin substrate.

9 Claims, No Drawings

METHOD FOR SURFACE-COATING SYNTHETIC RESINS

TECHNICAL FIELD

The present invention relates to a method of applying, to a synthetic resin substrate, a surface protective coating which is excellent in weather resistance and chemical resistance.

BACKGROUND ART

Hitherto a range of use of general-purpose resins such as vinyl chloride resin, vinyl acetate resin and acrylic resin and in addition, engineering plastics such as nylon, polyacetal, polycarbonate, modified PPO resin and modified PBT resin has been increasing in various fields because they have excellent heat resistance and impact resistance. For improvement in light stability and solvent resistance (solvent cracking) thereof, coating with a fluorine-containing resin has been desired.

As the method of such coating, a solvent-coating method of coating a fluorine-containing resin dissolved in a specific solvent has been proposed (JP-A-63-199771). However since a solvent is used, the method is disadvantageous from the viewpoint of removal of solvent, cost for recovering a solvent and working environment such as safety. In view of improvement of those properties, development of an aqueous coating method has been desired.

When a synthetic resin substrate contacts a solvent, deterioration of its surface arises. In order to prevent the surface deterioration, there has been proposed a method of coating by using a solvent having a low solubility such as a non-polar solvent or an alcoholic solvent. However in that method, sufficient adhesion to the resin substrate cannot be obtained.

The present invention can provide a method of forming a surface protective coating of a fluorine-containing resin on a surface of synthetic resin, in which the above-mentioned problems can be eliminated by applying the fluorine-containing resin composition in the form of an aqueous dispersion and then drying.

DISCLOSURE OF THE INVENTION

The present invention provides a method of forming, on a synthetic resin, a surface protective coating layer being excellent in weather resistance and chemical resistance by applying an aqueous dispersion of fluorine-containing resin to a surface of the synthetic resin.

Also the present invention provides a transparent laminated article of synthetic resin which is obtained by the above-mentioned method. Further it is preferable that the fluorine-containing resin in the aqueous dispersion has at least one functional group selected from the group consisting of hydroxyl, epoxy and carboxyl.

In the present invention, an aqueous dispersion of fluorine-containing resin is an aqueous dispersion in which the fluorine-containing resin particles are stably dispersed in water. Such an aqueous dispersion of fluorine-containing resin itself is a known one (for example, JP-A-8-120210, JP-A-8-120211, JP-A-4-7784, JP-A-7-258499).

BEST MODE FOR CARRYING OUT THE INVENTION

Examples of the fluorine-containing resin particles used for the aqueous dispersion of fluorine-containing resin of the present invention are particles of (1) a fluoroolefin polymer, (2) a copolymer of fluoroolefin and monomer copolymerizable therewith and (3) a composite resin comprising a non-fluorine-containing resin and the above-mentioned polymer or copolymer.

Examples of fluoroolefin are, for instance, fluoroolefins having 2 to 4 carbon atoms such as vinyl fluoride, vinylidene fluoride (VdF), tetrafluoroethylene (TFE), chlorotrifluoroethylene (CTFE), hexafluoropropylene (HFP) and trifluoroethylene.

Examples of the fluoroolefin polymer (1) are homopolymers of those fluoroolefins or copolymers comprising two or more of those fluoroolefins. Examples thereof are homopolymers of VdF, TFE and CTFE, VdF/TFE copolymer, VdF/HFP copolymer, VdF/CTFE copolymer, VdF/TFE/CTFE copolymer, VdF/TFE/HFP copolymer, TFE/HFP copolymer, and the like.

An aqueous dispersion of particles of fluoroolefin polymer (1) can be prepared through usual emulsion polymerization, for example, by emulsion-polymerizing, through usual method, the above-mentioned fluoroolefin in the presence of an emulsifying agent in an amount of not more than 5% (% by weight, hereinafter the same unless particularly noted), preferably not more than 1% on the basis of water.

Water used for the emulsion polymerization is preferably de-ionized water. Also it is preferable that the emulsifying agent is a fluorine-containing surfactant. Further a reactive fluorine-containing emulsifying agent can be used. It is also possible to use a slight amount of non-fluorine-containing nonionic emulsifying agent together.

The fluorine-containing emulsifying agent used in the present invention is one or a mixture of compounds containing fluorine atoms in their structures and having surface activity. For example, there are an acid represented by $X(CF_2)nCOOH$, in which n is an integer of 6 to 20, X is F or H, its metal salt, ammonium salt, amine salt or quaternary ammonium salt; an acid represented by $Y(CH_2CF_2)mCOOH$, in which m is an integer of 6 to 13, Y is F or Cl, its metal salt, ammonium salt, amine salt or quaternary ammonium salt; and the like. In addition, it is possible to use solely a reactive emulsifying agent disclosed in JP-A-8-67795 and to use the reactive emulsifying agent in combination with the above-mentioned fluorine-containing emulsifying agent. Also it is possible to use a non-fluorine-containing nonionic emulsifying agent disclosed in JP-A-7-90153 together.

Then the copolymer (2) comprising fluoroolefin and monomer copolymerizable therewith is explained below.

Examples of the monomer copolymerizable with fluoroolefin are, for instance, ethylene; a-olefins such as propylene and isobutylene; vinyl ethers such as ethyl vinyl ether (EVE), cyclohexyl vinyl ether (CHVE), hydroxybutyl vinyl ether (HBVE), butyl vinyl ether, isobutyl vinyl ether, methyl vinyl ether and polyoxyethylene vinyl ether; allyl ethers such as polyoxyethylene allyl ether, ethyl allyl ether and hydroxyethyl allyl ether; allyl alcohols such as allyl alcohol, diallyl alcohol and eugenol; vinyl esters such as vinyl acetate, vinyl lactate, vinyl butyrate, vinyl pivalate, vinyl benzoate, and VEOVA9 and VEOVA10 (brand names of products available from Shell Chemical Co., Ltd.); allyl esters such as allyl acetoacetate; ethylenically unsaturated carboxylic acids such as itaconic anhydride, succinic anhydride and crotonic acid; and the like. Particularly ethylene, α-olefins, vinyl ethers, vinyl esters, allyl ethers and allyl esters are preferably used.

Examples of the copolymer (2) comprising fluoroolefin and monomer copolymerizable therewith are TFE/propylene copolymer, TFE/ethylene copolymer, TFE/vinyl ester copolymers, TFE/vinyl ether copolymers, HFP/vinyl ether copolymers, HFP/vinyl ester copolymers, CTFE/vinyl ether copolymers, and the like. Further there are copolymers comprising three or more monomers, i.e. copolymers containing the above-mentioned copolymer and as a modifying monomer, the above-mentioned monomer copolymerizable with fluoroolefin in an amount of not more than 30% by mole.

It is preferable that the fluoroolefin monomer is contained in those copolymers comprising fluoroolefin and monomer copolymerizable therewith in an amount of 20 to 80% by mole.

When an amount of the fluoroolefin monomer is less than 20% by mole, weather resistance cannot be exhibited sufficiently. When more than 80% by mole, it is not preferable because at the time of making a coating and forming a coating film, lowering of appearance occurs.

The aqueous dispersion of particles of fluoroolefin copolymer (2) can be prepared, for example, through the same emulsion polymerization as in the preparation of the aqueous dispersion of particles of fluoroolefin polymer (1).

It is preferable that the copolymer of fluoroolefin and monomer copolymerizable with fluoroolefin has at least one functional group selected from the group consisting of hydroxyl, epoxy and carboxyl. Examples of a preferred monomer for introducing such a functional group are, as monomers having hydroxyl, hydroxyl-containing vinyl ethers such as HBVE; hydroxyl-containing allyl compounds such as allyl alcohol and hydroxyethyl allyl ether; hydroxyl-containing (meth)acrylates such as hydroxyethyl (meth)acrylate, hydroxypropyl (meth)acrylate, hydroxybutyl (meth)acrylate and polyethylene glycol (meth)acrylate; and the like. Also as a glycidyl-containing monomer for introducing epoxy, there are allyl glycidyl ether, glycidyl (meth)acrylate and the like. As a carboxyl-containing monomer, there are an acrylic acid, methacrylic acid, succinic acid, itaconic acid, crotonic acid, fumaric acid, maleic acid, and the like.

It is preferable that a content of such a functional group-containing monomer unit in the fluorine-containing resin is from 0.1 to 30% by mole. When less than 0.1% by mole, in some cases, adhesion of a fluorine-containing resin to a substrate is insufficient. When more than 30% by mole, there is a case where stability of the composition and water resistance of an obtained coating film are lowered.

Subsequently the composite resin (3) which is one of the fluorine-containing resins used in the present invention is explained below.

Examples of the composite resin comprising the polymer (1) or copolymer (2) and a resin containing no fluorine are a fluorine-containing composite resin prepared by seed-polymerizing, in water medium, a monomer having a, radically polymerizable unsaturated bond in the presence of particles of the fluoroolefin polymer (1) or the copolymer (2) comprising fluoroolefin and monomer copolymerizable therewith, and the like.

Examples of the monomer having a radically polymerizable unsaturated bond are alkyl acrylates having alkyl of C1 to C18, alkyl methacrylates having alkyl of C1 to C18, a monomer having an ethylenically unsaturated unit being copolymerizable therewith, and the like.

As the alkyl acrylates having alkyl of C1 to C18, there are, for example, methyl acrylate, ethyl acrylate, propyl acrylate, n-butyl acrylate, isobutyl acrylate, 2-ethylhexyl acrylate, lauryl acrylate and the like.

As the alkyl methacrylates having alkyl of C1 to C18, there are, for example, methyl methacrylate, ethyl methacrylate, propyl methacrylate, n-propyl methacrylate, isobutyl methacrylate, cyclohexyl methacrylate, lauryl methacrylate and the like.

For the purposes to enhance solvent resistance and water resistance, it is possible to copolymerize a polyfunctional monomer such as ethylene glycol dimethacrylate and propylene glycol dimethacrylate.

Examples of the monomer which has ethylenically unsaturated unit being copolymerizable with the acrylate and/or the methacrylate are, for instance, ethylene; α-olefins such as propylene and isobutylene; vinyl ethers such as ethyl vinyl ether (EVE), cyclohexyl vinyl ether (CHVE), hydroxybutyl vinyl ether (HBVE), butyl vinyl ether, isobutyl vinyl ether, methyl vinyl ether and polyoxyethylene vinyl ether; allyl ethers such as polyoxyethylene allyl ether, ethyl allyl ether and hydroxyethyl allyl ether; allyl alcohols such as allyl alcohol, diallyl alcohol and eugenol; allyl esters such as allyl acetoacetate; vinyl esters such as vinyl acetate, vinyl lactate, vinyl butylate, vinyl pivalate, vinyl benzoate, and VEOVA9 and VEOVA10 (brand names of products available from Shell Chemical Co., Ltd.); ethylenically unsaturated carboxylic acids such as itaconic anhydride, succinic anhydride and crotonic acid; aromatic vinyl compounds such as styrene, α-methyl styrene and p-tert-butyl styrene; acrylonitrile; and the like.

Among the polymers (1) and copolymers (2) as the seed particles, from the viewpoint of good compatibility with the above-mentioned acrylic monomer at the time of seed polymerization, VdF fluoroolefin polymer (1) is preferred, and further preferred is the polymer (1) containing a VdF unit in an amount of not less than 50% by mole.

In the present invention, it is preferable that the composite resin (3) contains 20 to 90% by mole of the polymer (1) or the copolymer (2) based on the whole composite resin (3).

When the fluoroolefin monomer is less than 20% by mole, weather resistance cannot be exhibited sufficiently, and when more than 90% by mole, it is not preferable because at the time of making a coating and forming a coating film, appearance is lowered.

Also in the present invention, it is preferable, in the seed polymerization, to use a monomer having at least one functional group selected from the group consisting of hydroxyl, epoxy and carboxyl to introduce the functional group in an amount of from 0.1 to 30% by mole based on the whole composite resin (3). As the preferred monomers having hydroxyl, there are hydroxyl-containing vinyl ethers such as HBVE; hydroxyl-containing allyl compounds such as allyl alcohol and hydroxyethyl allyl ether; hydroxyl-containing (meth)acrylates such as hydroxyethyl (meth) acrylate, hydroxypropyl (meth)acrylate, hydroxybutyl (meth)acrylate and polyethylene glycol (meth)acrylate; and the like. Also as a glycidyl-containing monomer for introducing epoxy, there are allyl glycidyl ether, glycidyl (meth) acrylate, and the like. As a carboxyl-containing monomer, there are (meth)acrylic acids, and the like.

The seed polymerization of the ethylenically unsaturated monomer can be carried out under the same conditions as in usual emulsion polymerization. For example, into a water medium containing particles of the fluorine-containing polymer (1) or (2) are added a surfactant, a polymerization initiator, a chain transfer agent and as case demands, a chelating agent, a pH control agent, a solvent, etc. and then reaction is conducted at about 20° C. to about 80° C. for about 0.5 hours to about 6 hours.

When the ethylenically unsaturated monomer is emulsion-polymerized in the presence of particles of the fluorine-containing polymer, it seems that at first, there occurs swelling of the particles of the fluorine-containing polymer with the monomer and at that time, the mixture becomes in the state of an aqueous dispersion of the fluorine-containing polymer dissolved uniformly in the acrylic monomer, and then the acrylic monomer is polymerized by adding an initiator, to form single phase polymer blend particles, in which the molecular chains are entangled with each other.

As a surfactant, there is used an anionic surfactant, nonionic surfactant or combination of the anionic and nonionic surfactants, and as case demands, an amphoteric surfactant can be used.

Examples of the anionic surfactant are a sulfate of higher alcohol, sodium alkylsulfonate, sodium alkylbenzenesulfonate, sodium dialkylsulfosuccinate, sodium alkyldiphenylether disulfonate, and the like. Examples of the nonionic surfactant are polyoxyethylene alkyl ethers, polyoxyethylene alkyl phenyl ethers, polyoxyethylene alkyl esters, polyoxyethylene alkyl phenyl esters, sorbitan alkyl esters, glycerol esters, their derivatives, and the like. As the amphoteric surfactant, there are lauryl betaine, and the like.

Further a so-called reactive emulsifying agent which is copolymerizable with the ethylenically unsaturated monomer can be used. Examples of commercially available reactive emulsifying agent are Blemmar PE-350, Blemmar PME-400 and Blemmar 70PEP350B (available from NOF Corporation); NK Ester M-40G, NK Ester M-90G and NK Ester M-230G (available from Shin-Nakamura Kagaku Kabushiki Kaisha); RMA450M (available from Nippon Nyukazai Kabushiki Kaisha); Aquaron HS10, Aquaron HS20, Aquaron HS1025, Aquaron RN10, Aquaron RN20, Aquaron RN30, Aquaron RN50 and Aquaron RN2025 (available from Dai-ichi Kogyo Seiyaku Kabushiki Kaisha); NK Ester AMP-60G, NK Ester CB-1, NK Ester SA and NK Ester A-SA (available from Shin-Nakamura Kagaku Kabushiki Kaisha); Eleminol JS2 and Eleminol RS30 (available from Sanyo Kasei Kabushiki Kaisha); Latemle WX (available from Kao Corporation); and the like.

An amount of the surfactant is usually from about 0.05 part by weight to about 5.0 parts by weight on the basis of 100 parts by weight of the ethylenically unsaturated monomer.

The initiator is not particularly limited as far as a radical which can be used for free radical polymerization in water medium is produced at 20° to 90° C. As case demands, the initiator can be used in combination with a reducing agent. Examples of the water-soluble initiator are a persulfate, hydrogen peroxide, 2,2-azobis(2-amidinopropane) hydrochloride (AJBA) and the like, and examples of the reducing agent are sodium pyrosulfite, sodium hydrogensulfite, sodium L-ascorbate, and the like. Examples of oil-soluble initiator are diisopropylperoxydicarbonate (IPP), benzoyl peroxide, dibutyl peroxide, azobisisobutyronitrile (AIBN), and the like.

An amount of the initiator is usually from about 0.05 part by weight to about 2.0 parts by weight on the basis of 100 parts by weight of the ethylenically unsaturated monomer.

A polymerization temperature is from 20° to 90° C., preferably from 30° to 70° C.

Examples of the chain transfer agent are a halogenated hydrocarbon (for example, chloroform, carbon tetrachloride, or the like), mercaptans (for example, n-dodecyl mercaptan, t-dodecyl mercaptan, or n-octyl mercaptan) and the like. An amount of the chain transfer agent is usually from 0 to about 5.0 parts by weight on the basis of 100 parts by weight of the ethylenically unsaturated monomer.

As the solvent, there may be used methyl ethyl ketone, acetone, trichlorotrifluoroethane, methyl isobutyl ketone, cyclohexanone, ethyl acetate, or the like in such a small amount as not lowering workability, safety against disaster, safety in environment and safety in production. By adding the solvent, there is a case where swelling property of the monomer into the seed polymer particles is improved.

The seed polymerization can be carried out by known methods, for example, a method of charging the whole amount of monomers in one lot in a reaction system in the presence of the seed particles, a method of charging a part of the monomers for the reaction and then charging the remaining monomers continuously or dividedly or a method of charging the whole amount of monomers continuously.

As the aqueous dispersion of fluorine-containing copolymer which is used for the seed polymerization, in order to decrease an average particle size after the seed polymerization to 200 nm or lower, preferable is an aqueous dispersion containing polymer particles having an average particle size of not more than 180 nm in a concentration of 30 to 50% and further preferable is an aqueous dispersion containing polymer particles having an average particle size of not more than 150 nm in a concentration of 35 to 60%. If the particle size of the resin after the seed polymerization exceeds 200 nm, sedimentation stability of the resin composition in the aqueous dispersion is lowered, and even if the resin composition is the same, elevation of a minimum film forming temperature of the aqueous dispersion of resin composition is resulted.

In the present invention, as described in the explanations of the resins (2) and (3), it is preferable that the fluorine-containing resin has hydroxyl, epoxy and/or carboxyl from the viewpoint of enhancing adhesion to a substrate. In case of other groups, for example, a hydrolyzable silyl group and amino group, adhesion to a substrate reversely tends to be lowered.

To the aqueous dispersion of the present invention can be added, depending on purposes, pigments such as inorganic pigment, synthetic pigment and organic pigment, organo silicate, colloidal silica, water-soluble silicate, viscosity control agent, pigment dispersing agent, anti-foaming agent, antifreezing agent, film forming auxiliary, ultraviolet ray absorbing agent, antioxidant, water-soluble melamine, aqueous dispersable isocyanate, etc. in a range not lowering transparency.

Also as case demands, an emulsion of a urethane resin, acrylic silicone resin or acrylic resin can be blended. There is a case where blending of those resin emulsions further improves adhesion to a substrate.

For example, to 100 parts by weight of an aqueous dispersion of fluorine-containing resin may be added 0 to 50 parts by weight of a film forming auxiliary such as a condensation derivative of ethylene glycol, propylene glycol, aliphatic ester, or a ketone solvent, and further 0 to 5 parts by weight of a benzophenone type, benzotriazole type, anilide oxalate type, cyano acrylate type or triazine type ultraviolet ray absorbing agent as it is or in the form of being dissolved in an organic solvent such as a film forming auxiliary and 0 to 2 parts by weight of a viscosity control agent. Further if necessary, an aqueous pigments dispersion, organo silicate, colloidal silica or water-soluble silicate may be added with stirring. Organo silicate is added as it is or if necessary, in the form of an aqueous dispersion by using a known emulsifying agent, and a phosphoric acid salt is added in the form of aqueous solution or aqueous dispersion. With respect to colloidal silica or water-soluble silicate, a commercially available one is added as it is or in the form of being diluted with water. Also one or more of them can be added simultaneously, and further as case demands, an antioxidant, etc. may be added in the form of being dissolved in an organic solvent such as a film forming auxiliary, and then stirred for mixing.

The obtained composition has a form applicable as a coating. For example, the composition is applied to a synthetic resin substrate by spray coating, flow coating, dip coating, etc. and dried at a temperature of from room temperature to 200° C., and thus a coated article having a surface protective coating layer can be obtained. Examples of the synthetic resin substrate, on which the surface protective coating layer is formed, are general-purpose resins such as vinyl chloride resin, vinyl acetate resin, styrene resin and acrylic resin; engineering plastics such as nylon, polyacetal, polycarbonate (PC), modified polyphenylene oxide (modified PPO), polyethylene terephthalate (PET), polybutylene terephthalate (PBT), polymethyl pentene (TPX), polysulfone, polyether sulfone (PES), polyphenylene sulfide (PPS), polyalylate, polyamide imide (PAI), polyether imide (PEI), polyether ether ketone (PEEK) and polyimide; and the like.

Among them, as the resin which can make the best use of the feature of the present invention, there are a vinyl chloride resin, acrylic resin, styrene resin, nylon, polycarbonate (PC), modified polyphenylene oxide (modified PPO), polysulfone, polyether sulfone (PES), and the like which are easily attacked by a polar solvent. Further a more preferable effect can be obtained in case of an acrylic resin, styrene resin, polycarbonate (PC), polysulfone and polyether sulfone (PES) which easily accumulate an internal stress and easily causes solvent cracking due to a solvent. Also from the viewpoint of transparency, an acrylic resin, styrene resin, polycarbonate and vinyl chloride resin are preferred.

In the present invention, a synthetic resin substrate includes those obtained by processing a starting synthetic resin into a desired form of film, plate, fiber or the like through known method such as injection molding, melt molding, extrusion molding, blow molding, compression molding, solution casting or emulsion casting.

The preferred combinations of components in the aqueous dispersion of the present invention are then raised below. The present invention is not limited to those combinations. "Part" represents a part by weight.

| (1) | (A) Aqueous dispersion of fluorine-containing resin<br>Fluorine-containing resin: VdF copolymer/acrylic polymer composite resin containing 1 to 30% by mole of epoxy<br>Concentration: 50% | 100 parts |
|---|---|---|
| | (B) Additives<br>Kind: Film forming auxiliary, viscosity control agent, anti-foaming agent, ultraviolet ray absorbing agent and antioxidant | 0 to 10 parts |
| | (C) Substrate: Polycarbonate | |

In this combination, a transparent resin laminated article being excellent in weather resistance and chemical resistance and useful for sun roof, fence, windshield hood, goggles, etc. can be obtained.

| (2) | (A) Aqueous dispersion of fluorine-containing resin<br>Fluorine-containing resin: VdF/acrylic polymer composite resin containing 1 to 10% by mole of hydroxyl<br>Concentration: 50% | 100 parts |
|---|---|---|
| | (B) Additives<br>Kind: Film forming auxiliary, viscosity control agent, anti-foaming agent, ultraviolet ray absorbing agent and antioxidant | 0 to 10 parts |
| | (C) Substrate: Polycarbonate | |

In this combination, a transparent resin laminated article being excellent in weather resistance and chemical resistance and useful for sun roof, fence, windshield hood, goggles, etc. can be obtained.

| (3) | (A) Aqueous dispersion of fluorine-containing resin<br>Fluorine-containing resin: VdF copolymer/acrylic polymer composite resin | 100 parts |
|---|---|---|

Concentration: 50%
(B) Additives 0 to 10 parts
    Kind: Urethane resin emulsion, film forming
    auxiliary, viscosity control agent, anti-foaming
    agent, ultraviolet ray absorbing agent and
    antioxidant
(C) Substrate: Vinyl chloride resin In this combination, a transparent resin laminated article being excellent in weather resistance and chemical resistance and useful for film for agriculture, net for construction, etc. can be obtained.

An acrylic resin, styrene resin, polycarbonate, vinyl chloride resin, polysulfone, polyether sulfone, etc. coated with the obtained aqueous dispersion of fluorine-containing resin are preferably used for applications requiring mainly transparency and weather resistance such as members for civil engineering and construction for outdoor use (for example, sound-insulating fence for road, house wall, balcony panel, sun roof, roof members, illumination fittings, exterior wall of green house, film for agriculture, net for construction, etc.), members for car (for example, windshield hood for motorcycle, protection cover for lamps and parts around panel), goggles, traffic signal, protection cover for advertising panel, liquid crystal panel cover, optical fiber, solar battery panel cover, information system-related disc, etc.

The present invention is then explained by means of preparation examples and examples, but is not limited to them.

PREPARATION EXAMPLE 1

A 200 ml stainless steel autoclave equipped with a stirrer was charged with 8.8 g of cyclohexyl vinyl ether (CHVE), 8.8 g of hydroxybutyl vinyl ether (HBVE), 4.0 g of macromonomer (PKA5003 available from NOF Corporation) having a hydrophilic moiety, 10.0 g of ethyl vinyl ether (EVE), 66.0 g of ion-exchanged water, 0.35 g of ammonium perfluorooctanoate (emulsifying agent), 0.35 g of potassium carbonate, 0.02 g of sodium hydrogen sulfite and 0.08 g of ammonium persulfate (initiator), followed by cooling with ice, increasing the inside pressure of the autoclave to 3.5 kg/cm$^2$ with pressurized nitrogen gas and deaerating. After the pressurizing and deaerating were repeated two times, deaeration up to 10 mmHg was carried out and dissolved oxygen was removed. Then 33.5 g of chlorotrifluoroethylene (CTFE) was added and reaction was carried out at 30° C. for 12 hours to give the aqueous dispersion of Preparation Example 1 containing particles of the fluorine-containing copolymer (2). A calculated content (concentration of functional group) of a hydroxyl-containing monomer in the resin was 26.8% by mole. A solid content of the obtained aqueous dispersion was 48% and an average particle size was 189 nm.

The aqueous dispersion was dried for one hour in a vacuum dryer of 150° C. The solid content was represented by a percentage of a weight of the aqueous dispersion after drying to a weight of the aqueous dispersion before drying.

The average particle size was measured with a laser beam scattering particle size analyzer (ELS-3000 available from Otsuka Denshi Kabushiki Kaisha).

Also the concentration of the functional group was calculated by using composition of the obtained polymer.

PREPARATION EXAMPLE 2

Synthesis of Aqueous Dispersion of VdF Copolymer

A 1-liter pressure resistant reaction vessel equipped with a stirrer was charged with 500 ml of deionized water, 0.5 g of ammonium perfluorooctanoate and 0.05 g of nonionic emulsifying agent (MYS40 available from Nikko Chemicals Co., Ltd.). After repeating feeding of pressurized nitrogen and deaerating and then removing dissolved oxygen, the inside pressure of the vessel was increased up to 10 kgf/cm$^2$ at 60° C. with a monomer mixture comprising vinylidene fluoride (VdF)/tetrafluoroethylene (TFE)/chlorotrifluoroethylene (CTFE) in a molar ratio of 74/14/12. Then 0.2 g of ammonium persulfate was added and the monomer mixture comprising VdF/TFE/CTFE in a molar ratio of 74/14/12 was supplied continuously so that the inside pressure became constant at 10 kgf/cm$^2$. After the 40-hour reaction, the inside of the vessel was rendered to normal temperature and normal pressure to terminate the reaction. A pH of the aqueous dispersion was adjusted to 6.5 with 5% sodium hydrogencarbonate. A solid content of the obtained aqueous dispersion of fluorine-containing copolymer (1) was 42% and an average particle size was 126 nm.

Seed Polymerization of Acrylic Monomer

A 200 ml four-necked flask equipped with a stirrer, cooling tube and thermometer was charged with 100 g of the aqueous dispersion of fluorine-containing copolymer (1), and thereto was added 1.5 g of a reactive emulsifying agent (JS2 available from Sanyo Kasei Kogyo Kabushiki Kaisha). Heating was carried out in water bath with stirring and after the bath temperature reached 75° C., an emulsion prepared by emulsifying a mixture comprising 17 g of methyl methacrylate (MMA), 3.0 g of hydroxyethyl methacrylate and 1.7 g of methoxypolyethylene glycol methacrylate (RMA450M available from Nippon Nyukazai Kabushiki Kaisha) with 10 g of a 1% aqueous solution of reactive emulsifying agent JS2 was added dropwise over one hour. Immediately after that, 1 ml of a 10% solution of potassium persulfate was added to initiate a reaction. Three hours after initiating of the reaction, the bath temperature was elevated to 85° C. and held for one hour, followed by cooling. After pH of the mixture was adjusted to 7 with aqueous ammonium, filtration was carried out with a 300 mesh metal net to give, as a filtrate, a bluish white aqueous dispersion of fluorine-containing composite resin (3). A solid content of the aqueous dispersion was 45.3%, and an average particle size was 162 nm.

PREPARATION EXAMPLES 3 TO 5

An aqueous dispersion of Preparation Examples 3 to 5 was prepared in the same manner as in Preparation Example 2 except that acrylic monomers for seed polymerization were changed as shown in Table 1. Characteristics thereof are shown in Table 1.

Abbreviations in Table 1 represent the following compounds.

VdF: Vinylidene fluoride
TFE: Tetrafluoroethylene
CTFE: Chlorotrifluoroethylene
CHVE: Cyclohexyl vinyl ether
HBVE: Hydroxybutyl vinyl ether
EVE: Ethyl vinyl ether
PKA5003: Macromonomer available from NOF Corporation (Polyoxyethylene allyl ether)
MMA: Methyl methacrylate
BA: Butyl acrylate
HEMA: Hydroxyethyl methacrylate
GMA: Glycidyl methacrylate
AAc: Acrylic acid

TABLE 1

|  | Preparation Example | | | | |
|---|---|---|---|---|---|
|  | 1 | 2 | 3 | 4 | 5 |
| Components of fluorine-containing resin (g) | | | | | |
| Fluorine-containing polymer | | | | | |
| VdF | — | 62.8 | 62.8 | 62.8 | 62.8 |
| TFE | — | 18.6 | 18.6 | 18.6 | 18.6 |
| CTFE | 33.5 | 18.6 | 18.6 | 18.6 | 18.6 |
| Other monomer | | | | | |
| CHVE | 8.8 | — | — | — | — |
| HBVE | 8.8 | — | — | — | — |
| EVE | 10.0 | — | — | — | — |
| PKA5003 | 4.0 | — | — | — | — |
| Monomer for seed polymerization (based on 100 g of seed particles) | | | | | |
| MMA | — | 17 | 20 | 24 | 24 |
| BA | — | — | 6 | 4 | 3 |
| HEMA | — | 3 | — | — | — |
| GMA | — | — | 38 | — | — |
| AAc | — | — | 2 | — | 1 |
| RMA450M | — | 1.7 | 2.4 | 2.0 | 2.0 |
| Amount of functional groups of fluorine-containing resin (% by mole) | 26.8 | 3 | 27 | 0 | 2 |
| Aqueous dispersion | | | | | |
| Solid content (% by weight) | 48 | 45.3 | 48.5 | 45.4 | 45.3 |
| Average particle size (nm) | 189 | 162 | 189 | 164 | 163 |

EXAMPLE 1

To the aqueous dispersion of fluorine-containing resin composition obtained in Preparation Example 1 was added 10% by weight of diethyl adipate solution of ultraviolet ray absorbing agent Tinuvin 1130 (available from Ciba Geigy Co., Ltd.), followed by stirring so that its amount became 20% by weight based on a solid content of the resin. Further to the aqueous dispersion were added 0.1% by weight of FS013B (available from Dow Corning Co., Ltd.) as an anti-foaming agent and 1.0% by weight of 10 wt % aqueous solution of Adekanol UH420 (available from Asahi Denka Kabushiki Kaisha) as a thickener, followed by stirring at 400 rpm for one hour to give a clear coating. The coating was applied and extended on a polycarbonate plate (available from Nippon Test Panel Kabushiki Kaisha) with a 10 mil doctor blade, and dried at room temperature for one hour and further dried at 120° C. for 20 minutes. The following tests were carried out by using the obtained test plate. The results are shown in Table 2.

Appearance: Appearance of the dried film was judged with naked eyes with respect to transparency, coloring and cracking of a substrate.

Adhesion: A cross-cut adhesion test was carried out by cutting the film surface into 25 squares of 2 mm. Figures in the table show the number of squares which remained after the adhesion test.

Hot water resistance test: After dipping the test plate in hot water of 80° C. for two hours, its appearance and adhesion were evaluated.

Weather resistance: A 200-hour accelerated weather resistance test was carried out with I-Super UV tester (available from Iwasaki Denki Kabushiki Kaisha), and appearance and color difference ($\Delta E$) were determined. A color-difference meter available from Suga Shikenki Kabushiki Kaisha was used.

EXAMPLES 2 TO 8

Test plates were produced in the same manner as in Example 1 except that an aqueous dispersion of fluorine-containing resin composition and a substrate were changed as shown in Table 2. The tests were carried out in the same manner as in Example 1. The results are shown in Table 2.

Comparative Example 1

An accelerated weather resistance test was carried out by using a non-coated polycarbonate plate. The results are shown in Table 2.

Comparative Example 2

A solvent lacquer type coating varnish Zeffle LC930 (available from DAIKIN INDUSTRIES, LTD.) of fluorine-containing resin as a solvent-based coating was applied and extended on a polycarbonate plate (available from Nippon Test Panel Kabushiki Kaisha) with a 10 mil doctor blade, and dried at room temperature for one hour and a small cracking arose on the substrate.

TABLE 2

| | Aqueous dispersion of fluorine-containing resin (Prep. Ex.) | Synthetic resin substrate | Initially | | After hot water resistance test | | Weather resistance | |
|---|---|---|---|---|---|---|---|---|
| | | | Appearance | Adhesion | Appearance | Adhesion | Appearance | Color difference |
| Ex. 1 | 1 | PC | Transparent | 25/25 | Transparent | 25/25 | Transparent | 15 |
| Ex. 2 | 2 | PC | Transparent | 25/25 | Transparent | 25/25 | Transparent | 2 |
| Ex. 3 | 2 | PMMA | Transparent | 25/25 | Transparent | 25/25 | Transparent | 3 |
| Ex. 4 | 2 | Polysulfone | Transparent | 25/25 | Transparent | 25/25 | Transparent | 5 |
| Ex. 5 | 2 | PES | Transparent | 25/25 | Transparent | 25/25 | Transparent | 5 |
| Ex. 6 | 3 | PS | Transparent | 25/25 | Transparent | 25/25 | Transparent | 4 |
| Ex. 7 | 5 | PC | Transparent | 25/25 | Transparent | 19/25 | Transparent | 4 |
| Ex. 8 | 4 | PC | Transparent | 25/25 | Transparent | 15/25 | Transparent | 2 |
| Com. Ex. 1 | — | PC | Transparent | — | — | — | Turned yellow | 31 |
| Com. Ex. 2 | Solvent type | PC | Cracking | — | — | — | — | — |

PC: Polycarbonate
PMMA: Polymethyl methacrylate
PES: Polyether sulfone
PS: Polystyrene

INDUSTRIAL APPLICABILITY

According to the present invention, a surface protective coating layer of a fluorine-containing resin being excellent in weather resistance and chemical resistance can be formed safely on a synthetic resin substrate with good adhesion thereto.

What is claimed is:

1. A method of forming a surface protective coating on a polycarbonate substrate which comprises applying an aqueous dispersion of fluorine-containing resin having epoxy group to the polycarbonate substrate.

2. The method of claim 1, wherein the aqueous dispersion of fluorine-containing resin is prepared by seed-polymerizing, in an aqueous dispersion of vinylidene fluoride resin, a monomer having radically polymerizable unsaturated bond with particles of said vinylidene fluoride resin.

3. The method of claim 1, wherein the polycarbonate substrate is transparent.

4. A polycarbonate laminated article having a surface protective coating layer formed by the method of claim 1.

5. The method of claim 2, wherein the polycarbonate substrate is transparent.

6. A polycarbonate laminated article having a surface protective coating layer formed by the method of claim 2.

7. A polycarbonate laminated article having a surface protective coating layer formed by the method of claim 3.

8. A polycarbonate laminated article having a surface protective coating layer formed by the method of claim 5.

9. The method of claim 1, which comprises applying the aqueous dispersion of fluorine-containing resin having epoxy group directly to the polycarbonate substrate.

* * * * *

UNITED STATES PATENT AND TRADEMARK OFFICE
CERTIFICATE OF CORRECTION

PATENT NO. : 6,361,865 B1
DATED : March 26, 2002
INVENTOR(S) : Nobuhiko Tsuda, Ryuiji Iwakiri, Masaru Nagato and Katsuhiko Imoto It is certified that error appears in the above-identified patent and that said Letters Patent is hereby corrected as shown below:

<u>Title page,</u>
Item [86], § 371 Date: "Mar. 9, 2000" should read -- Nov. 1, 1999 --.
§ 102(e) Date: "Mar. 9, 2000" should read -- Nov. 1, 1999 --.

Signed and Sealed this

Twenty-second Day of October, 2002

Attest:

Attesting Officer

JAMES E. ROGAN
*Director of the United States Patent and Trademark Office*